(12) United States Patent
Kuo (10) Patent No.: US 9,132,695 B2
(45) Date of Patent: Sep. 15, 2015

(54) QUICK RELEASE DEVICES

(71) Applicant: A-PRO TECH CO., LTD., Taichung (TW)

(72) Inventor: Chih-Ping Kuo, Taichung (TW)

(73) Assignee: A-PRO TECH CO., LTD., Taichung (TW)

( * ) Notice: Subject to any disclaimer, the term of this patent is extended or adjusted under 35 U.S.C. 154(b) by 293 days.

(21) Appl. No.: 13/913,037

(22) Filed: Jun. 7, 2013

(65) Prior Publication Data

US 2013/0328385 A1 Dec. 12, 2013

(30) Foreign Application Priority Data

Jun. 8, 2012 (TW) ............................. 101120681 A (51) Int. Cl.
*B60B 35/00* (2006.01)
*B60B 27/00* (2006.01)
*B60B 27/02* (2006.01)

(52) U.S. Cl.
CPC .............. *B60B 27/026* (2013.01); *B60B 35/004* (2013.01); *B60B 2900/111* (2013.01); *B60B 2900/112* (2013.01); *Y02T 10/86* (2013.01)

(58) Field of Classification Search
CPC ........ B62K 21/02; B62K 25/02; B62K 25/04; B60B 27/00; B60B 31/00
USPC ......... 301/124.1, 124.2, 125; 280/279, 288.4; 403/322.1, 322.4, 374.1, 374.5, DIG. 4
See application file for complete search history.

(56) References Cited

U.S. PATENT DOCUMENTS

| | | | |
|---|---|---|---|
| 6,260,931 B1 * | 7/2001 | Stewart | 301/124.2 |
| 7,523,998 B2 * | 4/2009 | Yu | 301/124.2 |
| 8,573,879 B2 * | 11/2013 | Chang | 403/322.4 |

* cited by examiner

*Primary Examiner* — John Walters
(74) *Attorney, Agent, or Firm* — Kilpatrick Townsend & Stockton LLP (57) ABSTRACT

A quick release device includes an axle tube, a pressing unit, and a driving unit. The axle tube extends through a bicycle frame, and has a plurality of through holes. The pressing unit includes a plurality of pressing members disposed respectively and movably within the through holes in the axle tube, and a pushing member movable axially in the axle tube. The driving unit includes a movable shaft. When the driving unit is changed to a locking state, the movable shaft moves the pushing member such that the pushing member pushes and moves the pressing member to press against the bicycle frame. When the driving unit is changed to a release state, the movable shaft moves the pushing member away from the pressing members to allow the pressing members to move radially away from the bicycle frame.

10 Claims, 11 Drawing Sheets

QUICK RELEASE DEVICES

CROSS-REFERENCE TO RELATED APPLICATION

This application claims priority of Taiwanese Application No. 101120681, filed on Jun. 8, 2012.

BACKGROUND OF THE INVENTION

1. Field of the Invention

This invention relates to a part of a bicycle, and more particularly to a quick release device.

2. Description of the Related Art

Figure 1:
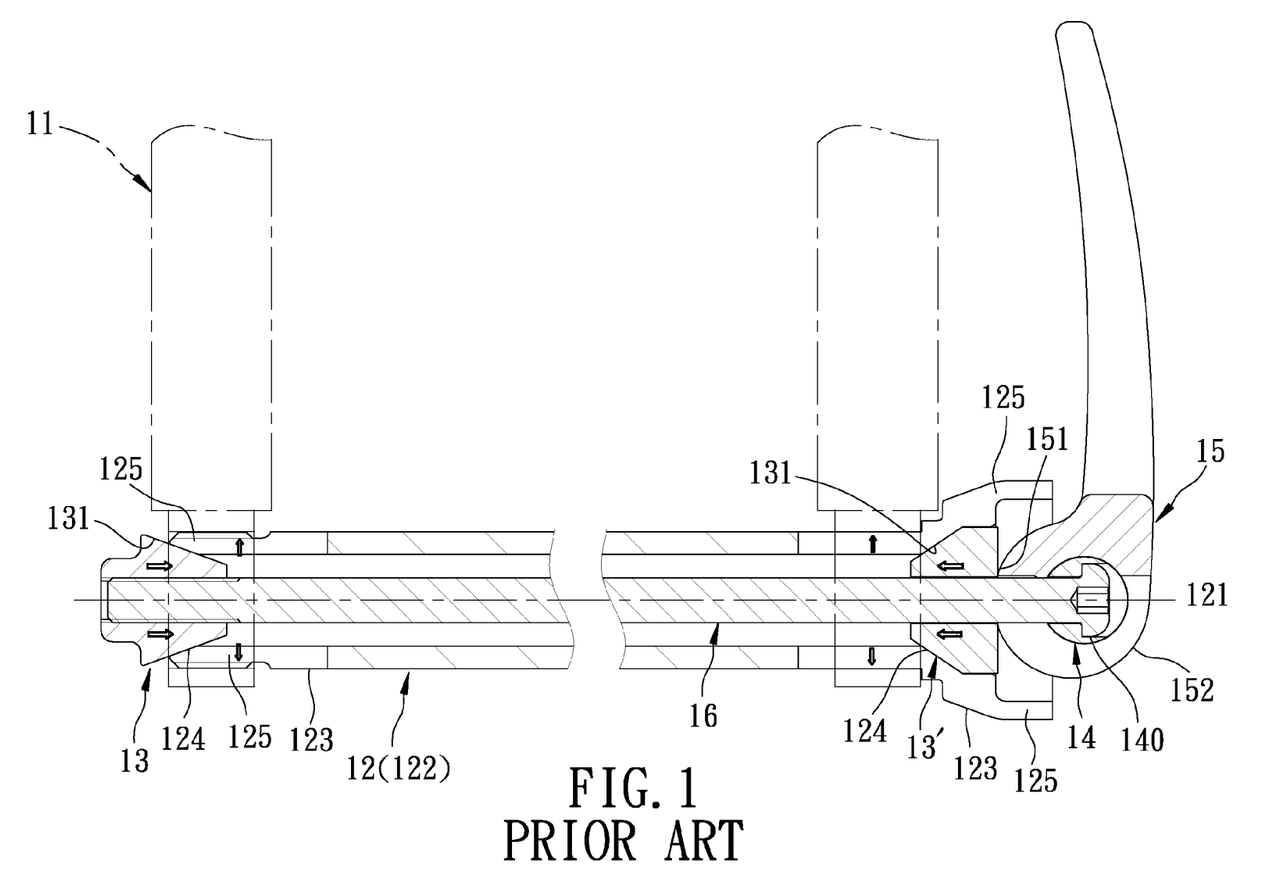
FIG. 1 is a schematic view illustrating use of a conventional quick release device mounted to a front fork of a bicycle.

Referring to FIG. 1, a conventional quick release device is mounted to a front fork 11 of a bicycle, and includes an axle tube 12, left and right pushing blocks 13, 13', a driving unit 14, a rotary lever 15, and a movable shaft 16.

The axle tube 12 extends through the front fork 11, and includes a tube wall 122 disposed around and extending along an axis 121 and having two deformable sections 123 disposed respectively at two opposite ends of the tube wall 122. Each of the deformable sections 123 has a frustoconical inner wall surface 124, and a plurality of open-ended slots 125 parallel to the axis 121 and formed through the tube wall 122.

Each of the left and right pushing blocks 13, 13' extends along the axis 121, is disposed within the corresponding deformable section 123, and has a pushing surface 131 for contact with the corresponding frustoconical surface 124.

The driving member 14 is cylindrical so as to serve as a rotating shaft, extends along a horizontal direction perpendicular to the axis 121, and is formed with a counterbore 140 in a middle portion thereof.

The rotary lever 15 is rotatable about the driving member 14, and has a pressing surface 151 and a release surface 152 that are opposite to each other. The distance between the pressing surface 151 and the driving member 14 is greater than that between the release surface 152 and the driving member 14.

The movable shaft 16 extends along the axis 121 and through the counterbore 140 in the driving member 14, the rotary lever 15, and the left and right pushing blocks 13, 13'. An enlarged right end of the movable shaft 16 abuts against the driving member 14. A left end of the movable shaft 16 is connected fixedly to the left pushing block 13.

The rotary lever 15 is pivotable relative to the axle tube 12 between a pressing position and a release position. When the rotary lever 15 is pivoted to the pressing position, the pressing surface 151 comes into contact with the right pushing block 13', so that the movable shaft 16 pulls the left pushing block 13 to press the pushing surfaces 131 against the frustoconical surfaces 124 of the deformable sections 123. At this time, due to the presence of the open-ended slots 125, the deformable sections 123 expand to thereby press the axle tube 12 against the front fork 11. Hence, the axle tube 12 is secured to the front fork 11. It should be noted that, the axle tube 12 may be mounted to a rear dropout (not shown).

When the rotary lever 15 is pivoted to the release position, the release surface 152 comes into contact with the right pushing block 13' to release the left and right pushing locks 13, so as to separate the pushing surfaces 131 from the frustoconical surfaces 124. Hence, the deformable sections 123 are returned to their original shapes, and can be separated easily from the front fork 11. At this time, the axle tube 12 can be removed from the front fork 11.

Since the open-ended slots 125 are formed in the deformable sections 123, the axle tube 12 can be pressed directly against and secured to the front fork 11. When used for a long time period, or when frequent assembly and disassembly occur, the front fork 11 and the axle tube 12 experience serious wear therebetween, thereby reducing the service life of the quick release device. Furthermore, to move the left and right pushing blocks 13, 13' simultaneously, the movable shaft 16 needs to have a length proximate to the axle tube 12. This results in an increase in the manufacturing cost and total weight.

SUMMARY OF THE INVENTION

The object of this invention is to provide a durable quick release device that can be made at a low cost.

According to this invention, a quick release device includes an axle tube, a pressing unit, and a driving unit. The axle tube extends through a bicycle frame, and has a plurality of through holes. The pressing unit includes a plurality of pressing members disposed respectively and movably within the through holes in the axle tube, and a pushing member movable axially in the axle tube. The driving unit includes a movable shaft. When the driving unit is changed to a locking state, the movable shaft moves the pushing member such that the pushing member pushes and moves the pressing members to press against the bicycle frame. When the driving unit is changed to a release state, the movable shaft moves the pushing member away from the pressing members to allow the pressing members to move radially away from the bicycle frame.

In the pressing state, since only the pressing members are in contact with the bicycle frame, a pressure exerted on the bicycle frame is relative uniform so that wear occurred between the quick release device and the bicycle frame is reduced to prolong the service life of the quick release device. Furthermore, the movable shaft can be disposed within only one end of the axle tube, thereby reducing the length of the movable shaft as well as, thus, the manufacturing cost and weight of the quick release device.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 2:
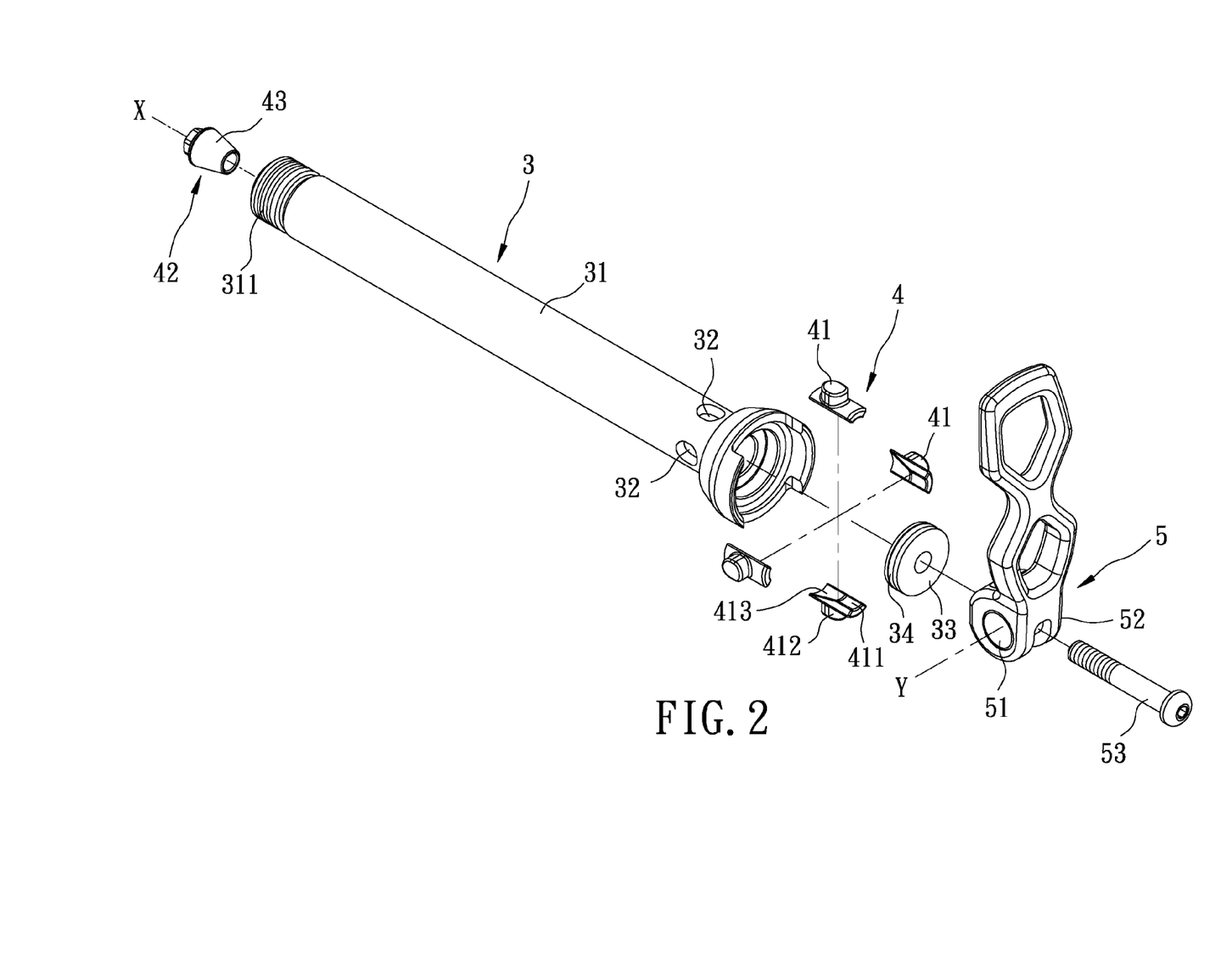
FIG. 2 is an exploded perspective view of the first preferred embodiment of a quick release device according to this invention, which is mounted to a front fork.
Figure 3:
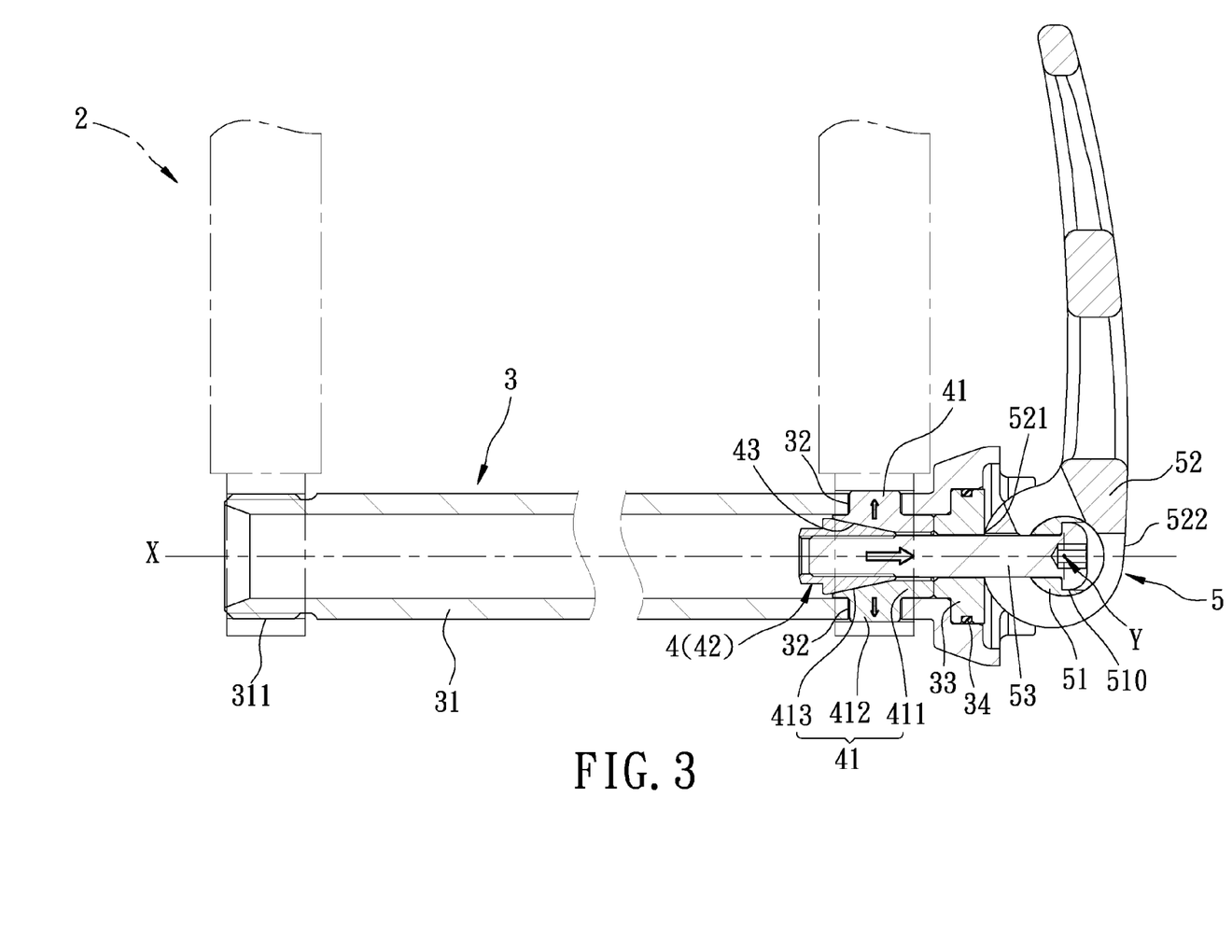
FIGS. 3 and 4 are schematic views of the first preferred embodiment, illustrating a pressing state of a driving unit.
Figure 4:
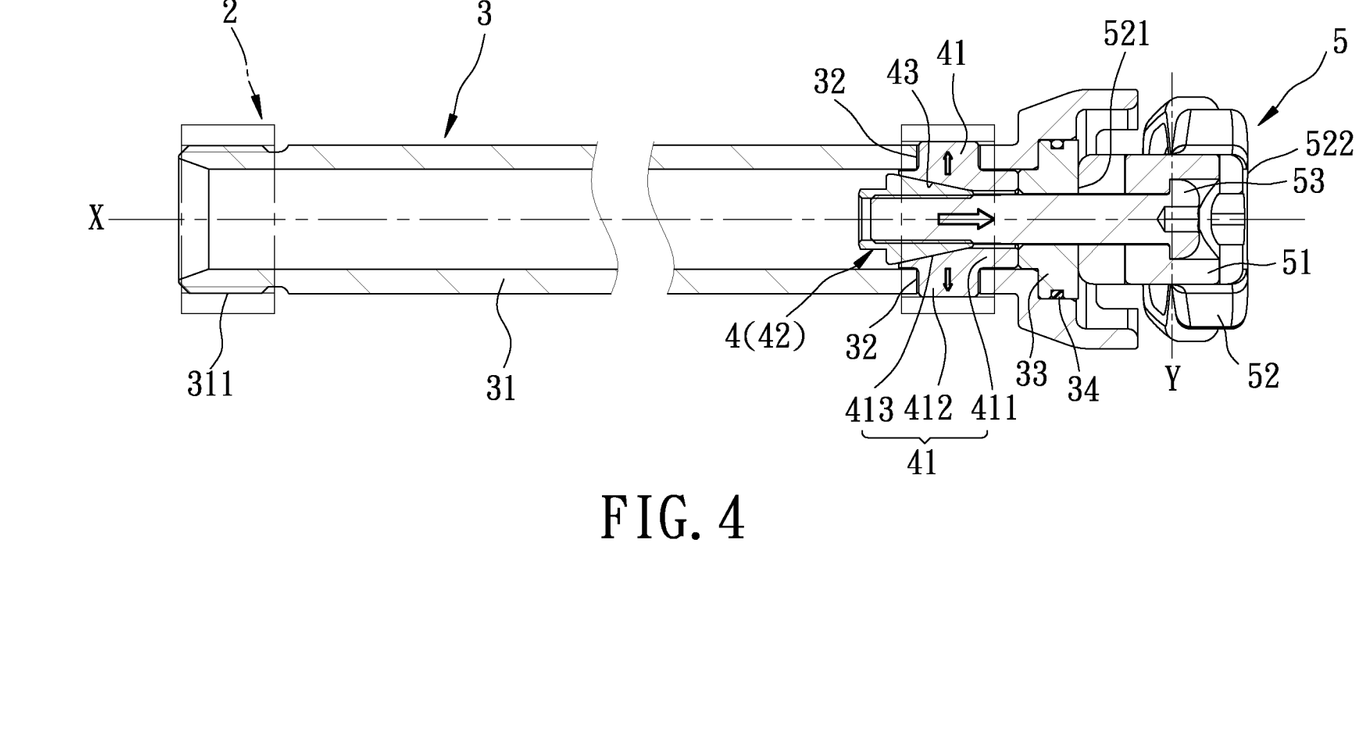

Referring to FIGS. 2, 3, and 4, the first preferred embodiment of a quick release device according to this invention is adapted to be mounted to a part of a bicycle frame 2, such as a front fork, and includes an axle tube unit 3, a pressing unit 4, and a driving unit 5.

The axle tube unit 3 extends along a horizontal axis (X) and through the bicycle frame 2, and includes an axle tube 31, a plurality of through holes 32 formed through a tube wall of the axle tube 31 and disposed around the axis (X), a support seat 33 disposed within an end of the axle tube 31 proximate to the driving unit 5, and a seal ring 34 disposed between the axle tube 31 and the support seat 33. A left end 311 of the axle tube 31 is threaded within the bicycle frame 2.

The pressing unit 4 includes a plurality of pressing members 41 disposed respectively and movably within the through holes 32 and abutting against the support seat 33, and a pushing member 42 movable axially in the axle tube 32 along the axis (X). The pushing member 42 has a frustoconical first contact surface 43.

The pressing members 41 are made of an elastic material, such as rubber. Each of the pressing members 41 has an annular base wall 411, a plurality of pressing blocks 412 extending outwardly from the base wall 411 and through the through holes 32 in the axle tube 31, respectively, and a frustoconical second contact surface 413 for contact with the first contact surface 43.

The first contact surface 43 of the pushing member 42 has a diameter that increases gradually in a direction away from the driving unit 5.

The driving unit 5 includes a cylindrical driving member 51 serving as a rotating shaft, a rotary lever 52 sleeved on and rotatable eccentrically about the driving member 51 and abutting against the support seat 33, and a movable shaft 53 connected fixedly to the pushing member 42 and extending along the axis (X).

The rotary lever 52 has a pressing surface 521 and a release surface 522 that are opposite to each other. The distance between the pressing surface 521 and the driving member 51 is greater than that between the release surface 521 and the driving member 51. An enlarged right end of the movable shaft 53 is confined within a counterbore 510 in the driving member 51 and the rotary lever 52 in a known manner.

The movable shaft 53 has a right end abutting against the driving member 51, and a left end connected fixedly to the pushing member 42.

Figure 5:
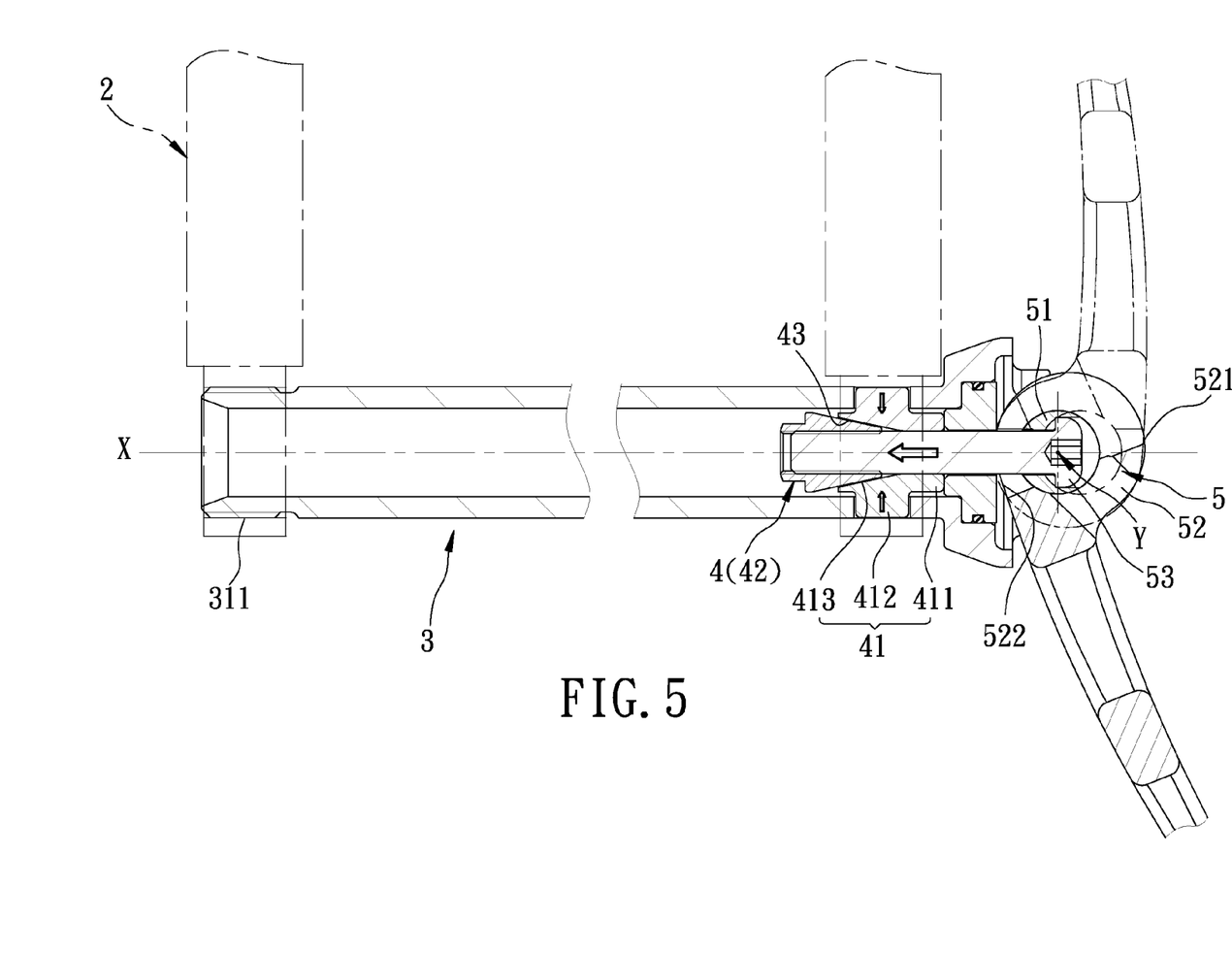
FIG. 5 is a schematic view of the first preferred embodiment, illustrating a release state of the driving unit.

The driving unit 5 is convertible relative to the axle tube unit 3 between a pressing state shown in FIGS. 3 and 4 and a release state shown in FIG. 5. During assembly, the axle tube unit 3 is extended through the bicycle frame 2, and is threaded into the bicycle frame 2 at the left end 311 thereof. Subsequently, the rotary lever 52 is pivoted to allow the pressing surface 521 to contact the support seat 33 such that the pressing surface 521 is disposed between the release surface 522 and the pushing member 42. Hence, the movable shaft 53 pulls the pushing member 42 to move toward the pressing surface 521 along the axis (X), so that the first contact surface 43 pushes the second contact surface 413 to press the pressing blocks 412 of the pressing member 41 against the bicycle frame 2 to thereby lock a right end of the axle tube unit 3 on the bicycle frame 2. At this time, the driving unit 5 is in the pressing state, and locks the axle tube unit 3 on the bicycle frame 2.

To remove the axle tube unit 3 from the bicycle frame 2, the rotary lever 52 is pivoted to allow the release surface 522 to contact the support seat 33, such that the release surface 522 is disposed between the pushing member 42 and the pressing surface 521. Hence, the movable shaft 53 pushes the pushing member 42 to move away from the release surface 522 along the axis (X) so as to move the pressing blocks 412 radially away from the bicycle frame 2 to thereby release the bicycle frame 2 from the pressing blocks 412. At this time, the driving unit 5 is in the release state, and removal of the axle tube unit 3 from the bicycle frame 2 is allowed.

Figure 6:
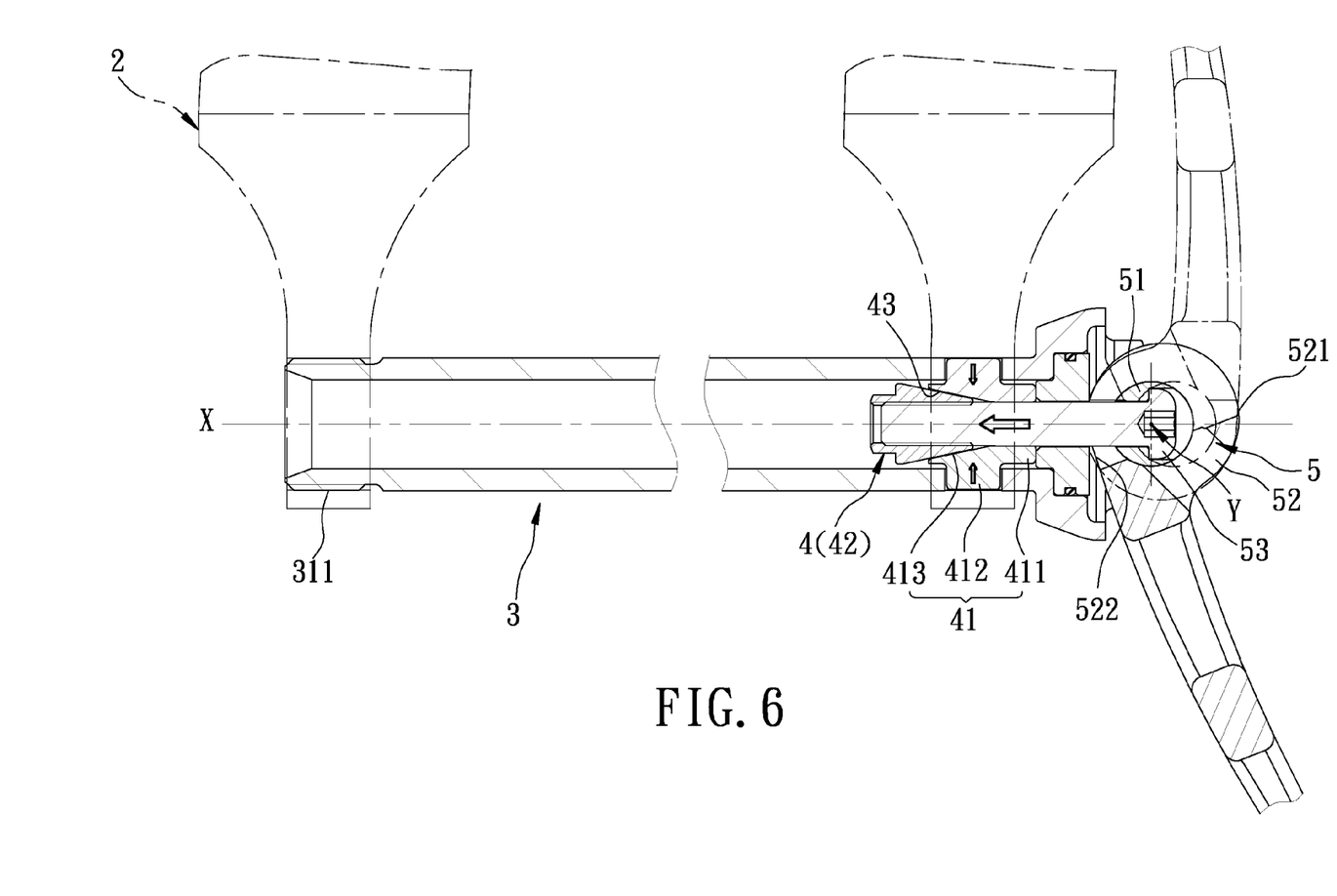
FIG. 6 is a schematic view of the first preferred embodiment, which is mounted to a rear dropout.

The quick release device may be applied to a rear dropout of a bicycle frame 2, as shown in FIG. 6.

In view of the above, the quick release device of this invention has the following advantages:

1. Since the axle tube unit 3 is secured to the bicycle frame 2 by pressing the pressing members 41 against the bicycle frame 2, a force applied from the pressing unit 4 to the bicycle frame 2 is relatively uniform, thereby facilitating firm connection between the quick release device and the bicycle frame 2.
2. In the pressing state, since only the pressing members 41 are in contact with the bicycle frame 2, wear occurred between the quick release device and the bicycle frame 2 is reduced to prolong the service life of the quick release device.
3. The movable shaft 53 can be disposed within only one end of the axle tube 31, thereby reducing the length of the movable shaft 53 as well as, thus, the manufacturing cost and weight of the quick release device.

Figure 7:
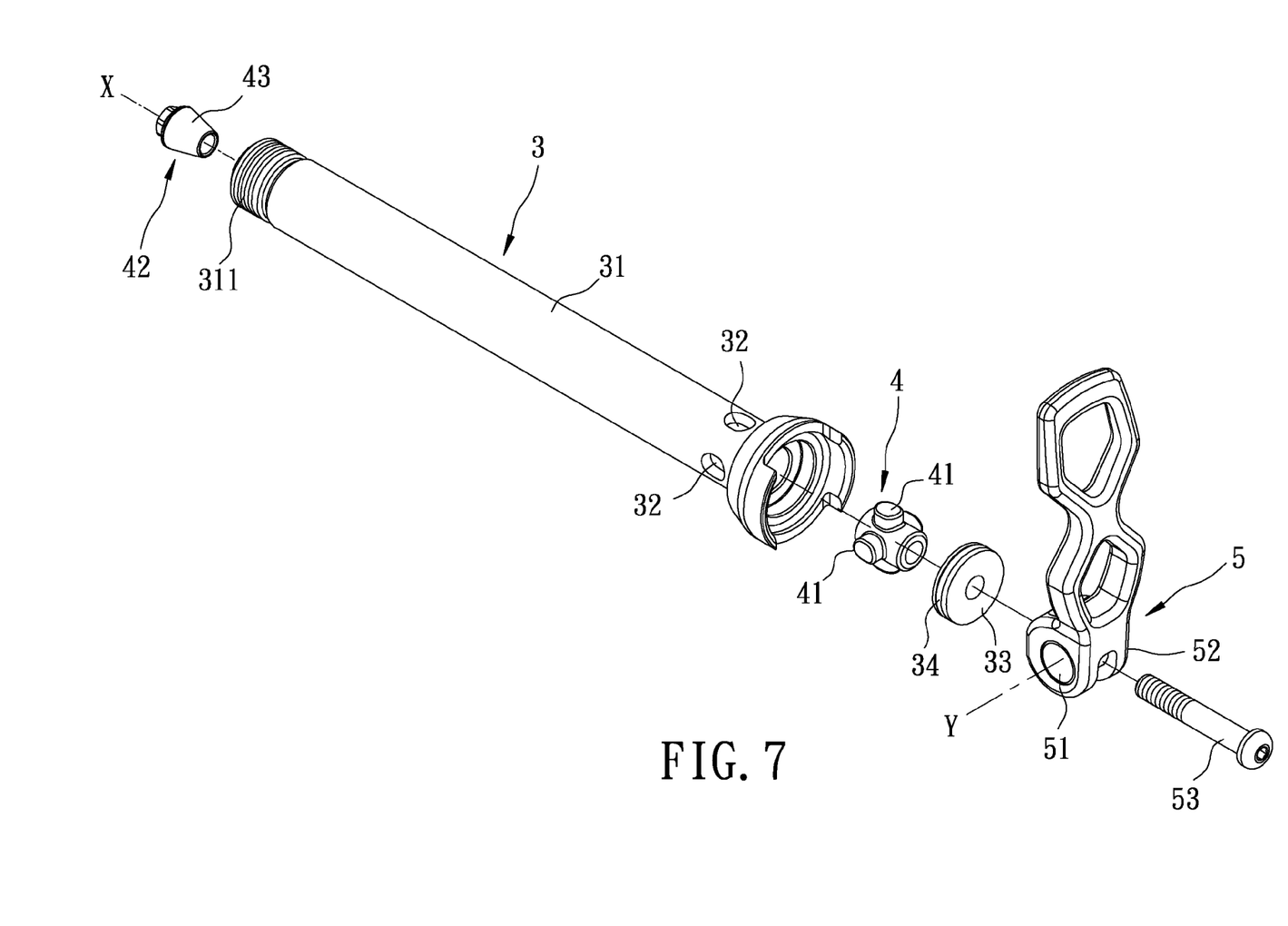
FIG. 7 is an exploded perspective view of the second preferred embodiment of a quick release device according to this invention when a driving unit is in a pressing state.

FIG. 7 shows the second preferred embodiment of a quick release device according to this invention, which differs from the first preferred embodiment in that the pressing members 41 of the pressing unit 4 are formed as one piece.

Figure 8:
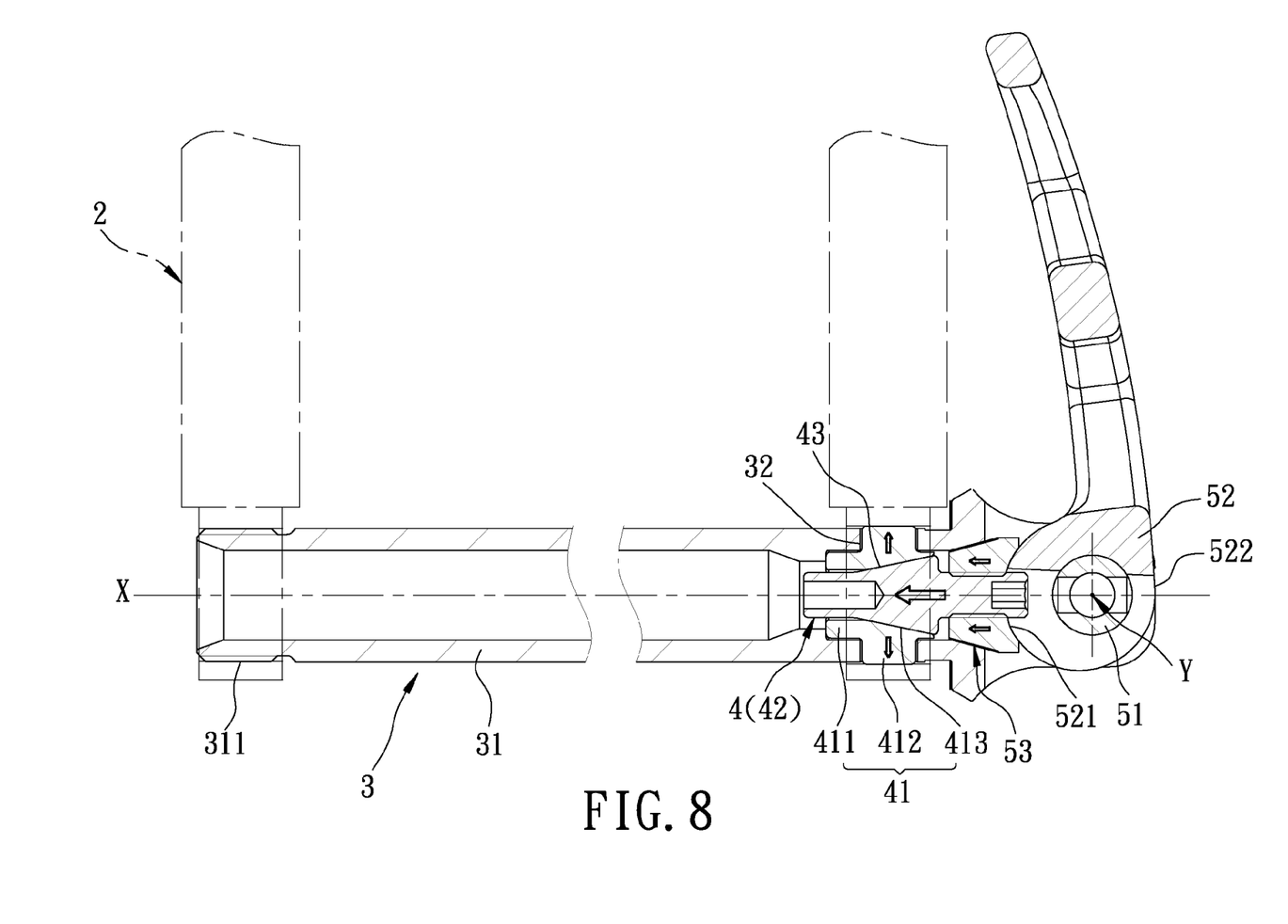
FIGS. 8 and 9 are schematic views of the third preferred embodiment of a quick release device according to this invention when a driving unit is in a pressing state.
Figure 9:
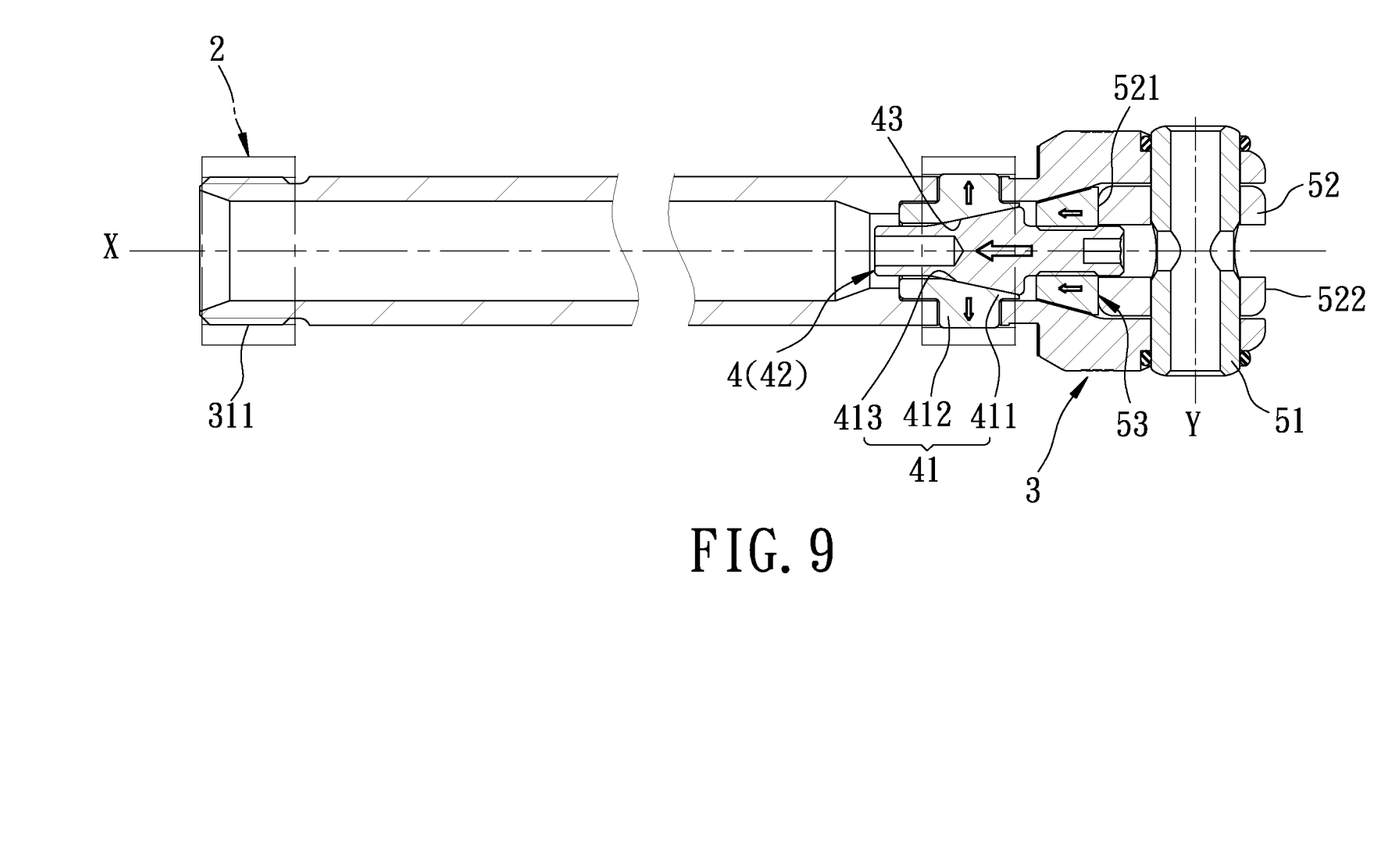

FIGS. 8 and 9 show the third preferred embodiment of a quick release device according to this invention, which is similar in construction to the first preferred embodiment except for the following.

The axle tube unit 3 includes only the axle tube 31 and the through holes 32. That is, the support seat 33 (see FIG. 7) and the seal ring 34 (see FIG. 7) are omitted from the axle tube unit 3.

The diameter of the first contact surface 43 of the pressing unit 4 reduces gradually in a direction away from the driving unit 5.

The right end of the movable shaft 53 is contactable with the rotary lever 52.

When the driving unit 5 is changed to the pressing state, the pressing surface 521 comes into contact with the movable shaft 53, so that the movable shaft 53 pushes the pushing member 42 to move away from the pressing surface 521. During movement of the pushing member 42 away from the pressing surface 521, the first contact surface 43 comes into contact with and pushes the second contact surface 413 to press the pressing blocks 412 of the pressing members 41 against the bicycle frame 2.

When removal of the axle tube unit 3 is desired, the rotary lever 52 is pivoted to allow the release surface 522 to align with the movable shaft 53, such that the release surface 522 is disposed between the movable shaft 53 and the pressing surface 521. Upon alignment of the release surface 522 with the movable shaft 53, a pressure is no longer applied by the rotary lever 52 to the movable shaft 53, so that the bicycle frame 2 is released from the pressing members 41. At this time, the axle tube 3 can be removed from the bicycle frame 2.

Figure 10:
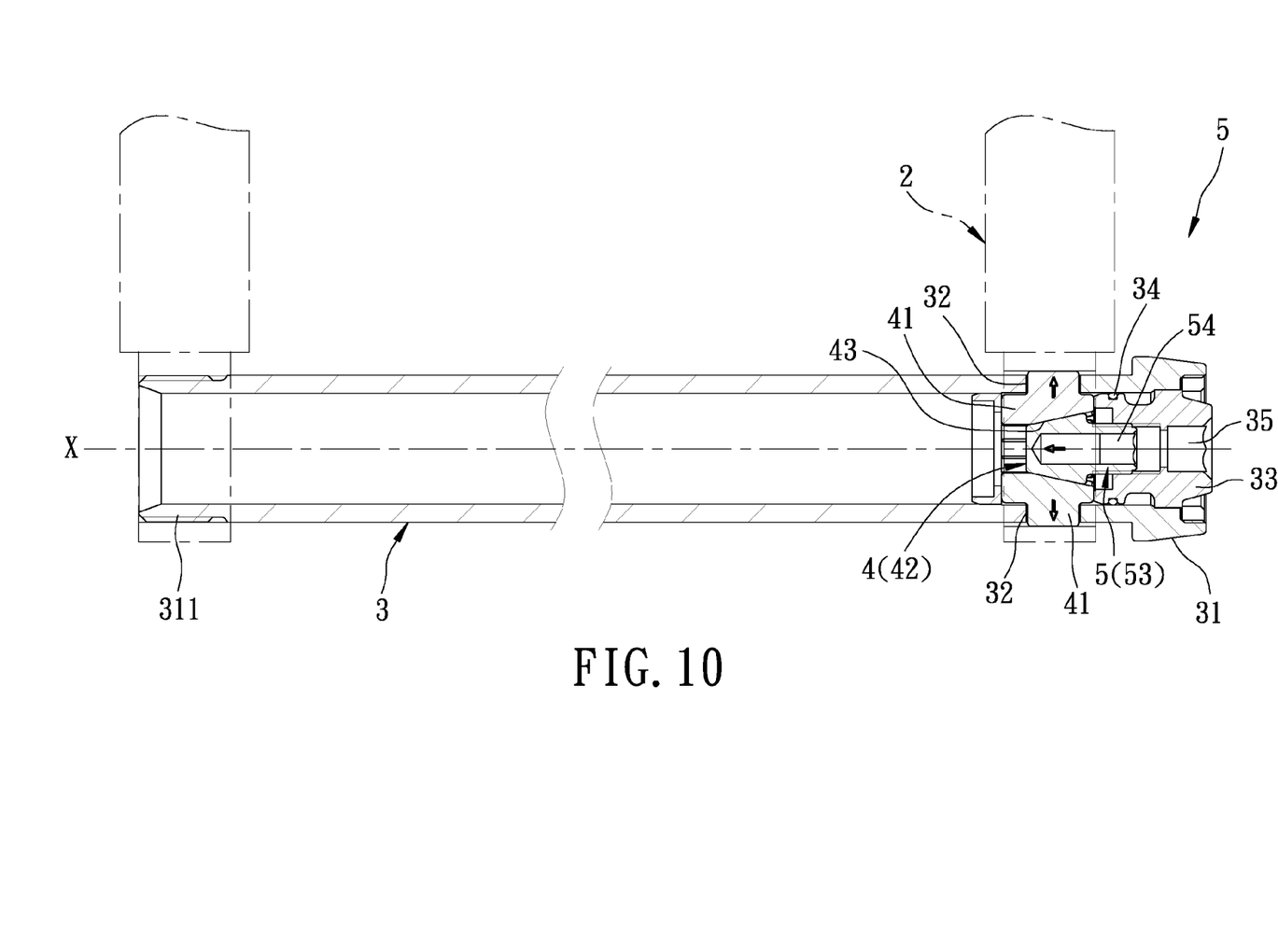
FIG. 10 is a schematic view of the fourth preferred embodiment of a quick release device according to this invention, illustrating a pressing state of a driving unit.
Figure 11:
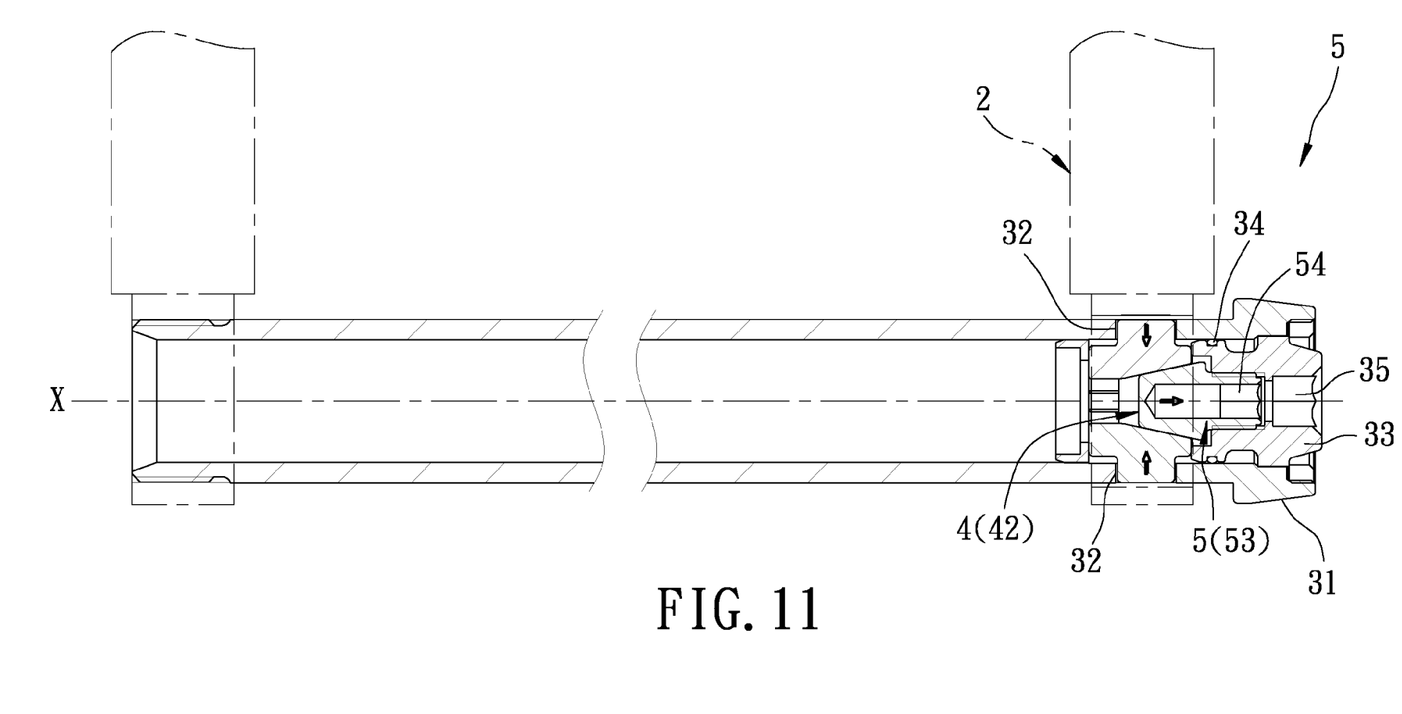
FIG. 11 is a view similar to FIG. 10 but illustrating a release state of the driving unit.

FIGS. 10 and 11 show the fourth preferred embodiment of a quick release device according to this invention, which is similar in construction to the third preferred embodiment.

Unlike the third preferred embodiment, the support seat 33 of the axle tube unit 3 is disposed fixedly within the right end of the axle tube 31, and has an axial hole 35 formed therethrough and extending along the axis (X).

The driving unit 5 includes only the movable shaft 53 connected to the pushing member 42. The movable shaft 53 is threaded to the support seat 33 at an end distal from the pushing member 42 (i.e., right end of the movable shaft 53), and is formed with a driving hole 54 that extends along the axis (X), that is in spatial communication with the axial hole 35 in the support seat 33, and that permits a spanner (not shown) to engage therewith such that the spanner is operable to rotate the movable shaft 53 in the axial tube 31. In this embodiment, the movable shaft 53 and the pushing member 42 are formed as one piece.

When the driving unit 5 is changed to the pressing state, the movable shaft 53, together with the pushing member 42, is moved away from the support seat 33 along the axis (X), so that the first contact surface 43 pushes the pressing members 41 to move radially and outwardly to thereby press against the bicycle frame 2.

When the driving unit 5 is changed to the release state, the movable shaft 53, together with the pushing member 42, is moved toward the support seat 33 along the axis (X), so as to move the pressing members 41 radially away from the bicycle frame 2.

In this embodiment, the driving hole 54 is a hexagonal hole, and the spanner is a hexagonal spanner.

When it is desired to convert the driving unit 5 between the pressing state and the release state, the spanner is extended through the axial hole 35 in the support seat 33 to engage the driving hole 54 in the movable shaft 53. Subsequently, by rotating the spanner, the movable shaft 53 can be moved toward or away from the support seat 33.

To summarize, the quick release device is secured to the bicycle frame 2 by pressing the pressing members 41 against the bicycle frame 2. In this manner, since the force applied to the bicycle frame 2 is uniform, wear experienced by the quick release device and the bicycle frame 2 is reduced so as to prolong the service life of the quick release device. Furthermore, since the through holes 32 and the pressing unit 4 are disposed at only an end of the axial tube unit 3, the length of the movable shaft 53 can be reduced, thereby resulting in a reduction in the manufacturing cost and total weight of the quick release device. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A quick release device adapted to be mounted to a bicycle frame, said quick release device comprising:
    an axle tube unit extending along a first axis and adapted to extend through the bicycle frame, said axle tube unit including an axle tube and a plurality of through holes formed through a tube wall of said axle tube and disposed around said first axis;
    a pressing unit including a plurality of pressing members disposed respectively and movably within said through holes, and a pushing member movable axially in said axle tube; and
    a driving unit convertible between a locking state and a release state and including a movable shaft connected to said pushing member, wherein, when said driving unit is changed to said locking state, said movable shaft moves said pushing member along said first axis such that said pushing member pushes and moves said pressing members to press against the bicycle frame, and when said said driving unit is changed to said release state, said movable shaft moves said pushing member away from said pressing members to allow said pressing members to move radially away from the bicycle frame.

2. The quick release device as claimed in claim 1, wherein said pushing member of said pressing unit has a first contact surface, said driving unit further including an elongate driving member connected to said movable shaft and extending along a second axis that is perpendicular to said first axis, and a rotary lever connected to and rotatable about said driving member, said rotary lever having a pressing surface and a release surface that are opposite to each other, the distance between said pressing surface and said driving member being greater than that between said release surface and said driving member, said pressing surface being disposed between said release surface and said pushing member when said driving unit is in said pressing state, said release surface being disposed between said pressing surface and said pushing member when said driving unit is in said release position so that, when said driving unit is changed to said pressing state, said movable shaft is driven by said rotary lever to move along said first axis such that said pressing members are pushed by said first contact surface of said pushing member to press against the bicycle frame.

3. The quick release device as claimed in claim 2, wherein each of said pressing members has a second contact surface for contact with said first contact surface.

4. The quick release device as claimed in claim 3, wherein each of said pressing members further has an annular base wall, and a plurality of pressing blocks extending outwardly from said base wall and through said through holes in said axle tube, respectively, said movable shaft having one end abutting against said driving member, and the other end connected fixedly to said pushing member such that, when said driving unit is changed to said pressing state, said pressing surface of said rotary lever comes into contact with said axle tube unit to move said pushing member toward said pressing surface, and when said driving unit is changed to said release state, said release surface comes into contact with said axle tube unit to move said pushing member away from said release surface.

5. The quick release device as claimed in claim 4, wherein said first contact surface of said pushing member is frustoconical, and has a diameter that increases gradually in a direction away from said driving unit.

6. The quick release device as claimed in claim 4, wherein said axle tube unit further includes a support seat disposed within an end of said axle tube proximate to said driving unit and in contact with said rotary lever, and a seal ring disposed between said axle tube and said support seat.

7. The quick release device as claimed in claim 2, wherein each of said pressing members of said pressing unit has an annular base wall disposed within said axle tube, an a plurality of pressing blocks extending outwardly from said base wall and through said through holes in said axle tube, respectively, said pushing member having a first contact surface in contact with said pressing members, said first contact surface being frustoconical and having a diameter that reduces gradually in a direction away from said driving unit, said movable shaft having one end abutting against said rotary lever, and the other end connected fixedly to said pushing member such that, when said driving unit is changed to said pressing state, said pressing surface of said rotary lever comes into contact with said movable shaft to move said pushing member away from said pressing surface, and when said driving unit is changed to said release state, said release surface of said rotary lever is moved to a position between said pressing surface and said movable shaft so as to move said pushing member toward said release surface.

8. The quick release device as claimed in claim 1, wherein said axle tube unit further includes a support seat disposed fixedly within an end of said axle tube and having an axial hole formed therethrough and extending along said first axis, said movable shaft being threaded to said support seat at an end distal from said pushing member and having an end surface formed with a driving hole that is in spatial communication with said axial hole in said support seat and that is adapted to permit a tool to engage therewith such that the tool is operable to rotate said movable shaft in said axle tube, so as to move said pushing member away from said support seat to thereby press said pressing members against the bicycle frame when said driving unit is changed to said pressing state, and so as to move said pushing member toward said support seat and away from said pressing members to thereby allow said pressing members to move radially away from the bicycle frame.

9. The quick release device as claimed in claim 1, wherein said pressing members of said pressing unit are made of an elastic material.

10. The quick release device as claimed in claim 1, wherein said pressing members of said pressing unit are formed as one piece.

\* \* \* \* \*